United States Patent [19]
Fäger

[11] Patent Number: 6,131,296
[45] Date of Patent: Oct. 17, 2000

[54] METHOD AND DEVICE FOR DETERMINING POSITIONS OF OBJECTS

[76] Inventor: Jan G. Fäger, Fågelpilsgatan 6, Västerås, Sweden, SE-723 53

[21] Appl. No.: 08/981,272
[22] PCT Filed: Jun. 17, 1996
[86] PCT No.: PCT/SE96/00782
§ 371 Date: Dec. 19, 1997
§ 102(e) Date: Dec. 19, 1997
[87] PCT Pub. No.: WO97/00454
PCT Pub. Date: Jan. 3, 1997

[30] Foreign Application Priority Data

Jun. 19, 1995 [SE] Sweden ................................ 9502220

[51] Int. Cl.⁷ .................................................. G01C 5/00
[52] U.S. Cl. .................. 33/293; 33/294; 33/1 G; 33/1 CC
[58] Field of Search .................. 33/293, 294, 1 G, 33/1 CC

[56] References Cited

U.S. PATENT DOCUMENTS

| | | | |
|---|---|---|---|
| 4,691,446 | 9/1987 | Pitches et al. | 33/1 CC |
| 4,820,041 | 4/1989 | Davidson et al. | 33/293 |
| 4,908,948 | 3/1990 | Gormley | 33/1 G |
| 5,087,125 | 2/1992 | Narutaki | 33/294 |
| 5,107,595 | 4/1992 | Stay et al. | 33/1 G |
| 5,207,003 | 5/1993 | Yamada et al. | 33/293 |

FOREIGN PATENT DOCUMENTS

| | | |
|---|---|---|
| 0420500 | 4/1991 | European Pat. Off. . |
| 0433538 | 6/1991 | European Pat. Off. . |
| 444530 | 4/1986 | Sweden . |
| 458427 | 4/1989 | Sweden . |
| 2239366 | 6/1991 | United Kingdom . |
| 2264016 | 8/1993 | United Kingdom . |
| WO87/06353 | 10/1987 | WIPO . |
| WO95/35479 | 12/1995 | WIPO . |
| WO96/09918 | 4/1996 | WIPO . |

*Primary Examiner*—Christopher W. Fulton
*Assistant Examiner*—Quyen Doan
*Attorney, Agent, or Firm*—Jacobson, Price, Holman & Stern, PLLC

[57] ABSTRACT

As equipment has a transducer (G) that receives signals from a number of objects with unknown positions and senses the directions from the transducer to the objects. The directions of the sight lines to the objects are sensed in at least two separate transducer locations. The transducer signals are supplied to calculator (CU) which calculates the positions of the objects.

30 Claims, 12 Drawing Sheets

METHOD AND DEVICE FOR DETERMINING POSITIONS OF OBJECTS

BACKGROUND OF THE INVENTION

1. Field of the Invention

The present invention relates to a method of determining the position of objects in equipment comprising at least one transducer designed to receive signals from a set of objects arranged to emit signals that propagate linearly between the objects and the transducer, and members arranged to produce direction-defining signals that define the direction of the sight lines from the transducer to the objects in relation to the transducer.

The invention also relates to an arrangement for creating a set of objects with known positions for equipment of the above type.

2. Description of the Related Art

The following terms are used in this application:

the location of an object is defined by the position and/or orientation of the object;

the position of an object is determined by a number of translation coordinates;

the orientation of an object is determined by a number of rotational coordinates.

Furthermore, the term object denotes an object able to emit signals that can be received by the transducer, that is to say signals that propagate linearly between the object and the transducer. Such signals are primarily optical signals with frequencies within the visible wavelength range or outside this range, such as infrared light. Examples of objects are light sources (e.g. light bulbs or light-emitting diodes), reflectors (e.g. markers of reflecting tape) or details of the transducer's surroundings identifiable by means of image analysis (e.g. corners, holes, light points or markers having a certain shape and with a colour or brightness that deviates from the surroundings). Alternatively other signal forms may be used, e.g. ultrasonic or microwave signals, in which case the objects, for instance, consist of sources or reflectors for these signals, for instance.

A position transducer arrangement is known through the Swedish patent specification No. 444 530. This arrangement preferably utilizes optical signals. An optical transducer is designed to sense the direction from the transducer to each of a number of light sources, whose positions in relation to each other are known. The transducer determines the directions to at least three such light sources. The arrangement has calculation means which, on the basis of the directions thus determined, determine the angles between the sight lines from the transducer to the light sources and which, on the basis of these directions and angles and of the known positions of the light sources in relation to each other, calculate the transducer's position and possibly also its orientation in relation to the light sources.

A position transducer arrangement operating in accordance with a similar principle is known through Swedish patent specification No. 458 427. Its transducer consists of a device that generates a two-dimensional image of its surroundings. An image-analysis system receives the information content of the image and scans the image for a number—at least three—of recognizable, predetermined details in the surroundings having known positions in relation to each other. The image analysis system determines the position of the details in the image. The arrangement also includes calculation means that, from the positions of the details in the image, determine the directions of the sight lines from the transducer to the details, from the directions determine the angles between the sight lines and, on the basis of these directions and angles and of the known relative positions of the details, calculate the position of the transducer and possibly also its orientation in relation to the details.

The older Swedish patent application No. 9403255-4 describes a control equipment utilizing a control device carried by an operator, e.g. in the form of a free handle. The control device has a transducer operating on the same principle as the transducers described in the two preceding paragraphs. With the aid of the transducer the directions are determined to a number of objects (e.g. light sources, markers or details identifiable in the surroundings by image analysis) with known relative positions. The equipment also has means which, on the basis of the directions thus determined, calculate the angles between the sight lines to the object and which, on the basis of these directions and angles and of the known positions of the objects, determine the position of the control device and possibly also its orientation in relation to the objects.

Equipment of the type described above requires that the transducer always has at least three objects with known positions within its field of vision (four objects are required for some configurations). A typical transducer of this type has a certain working range within which it can alter location, i.e. position and/or orientation during use. To ensure that the transducer always has a sufficient number of suitably positioned objects within its field of vision, regardless of its actual location in the working range, therefore, more than three objects are generally required, and if the working range is large a relatively large number of objects is required. The relative positions of these objects must be known with great accuracy. The positions of the objects must therefore be measured both when the equipment is commissioned and if the working range is to be extended or altered.

Known measuring methods employing distance and/or angle measurement, triangulation or the like have hitherto been used to determine the positions of objects in equipment of the type in question. Determination of the positions to the high degree of accuracy required demands special equipment, e.g. theodolites, and expert knowledge, as well as being complicated and time-consuming. These circumstances have generally entailed a considerable practical and economic drawback.

SUMMARY OF THE INVENTION

The object of the invention is to provide a method and arrangement that enable a set of objects to be created quickly and simply, and without special equipment, or with a minimum of such equipment, with accurately known positions, for use in equipment of the type described in the preamble.

The characteristic features of a method and arrangement according to the invention are revealed in the appended claims.

BRIEF DESCRIPTION OF THE DRAWINGS

The invention will be described in more detail in the following with reference to the accompanying FIGS. 1–5.

DETAILED DESCRIPTION OF THE INVENTION

Figure 1A:
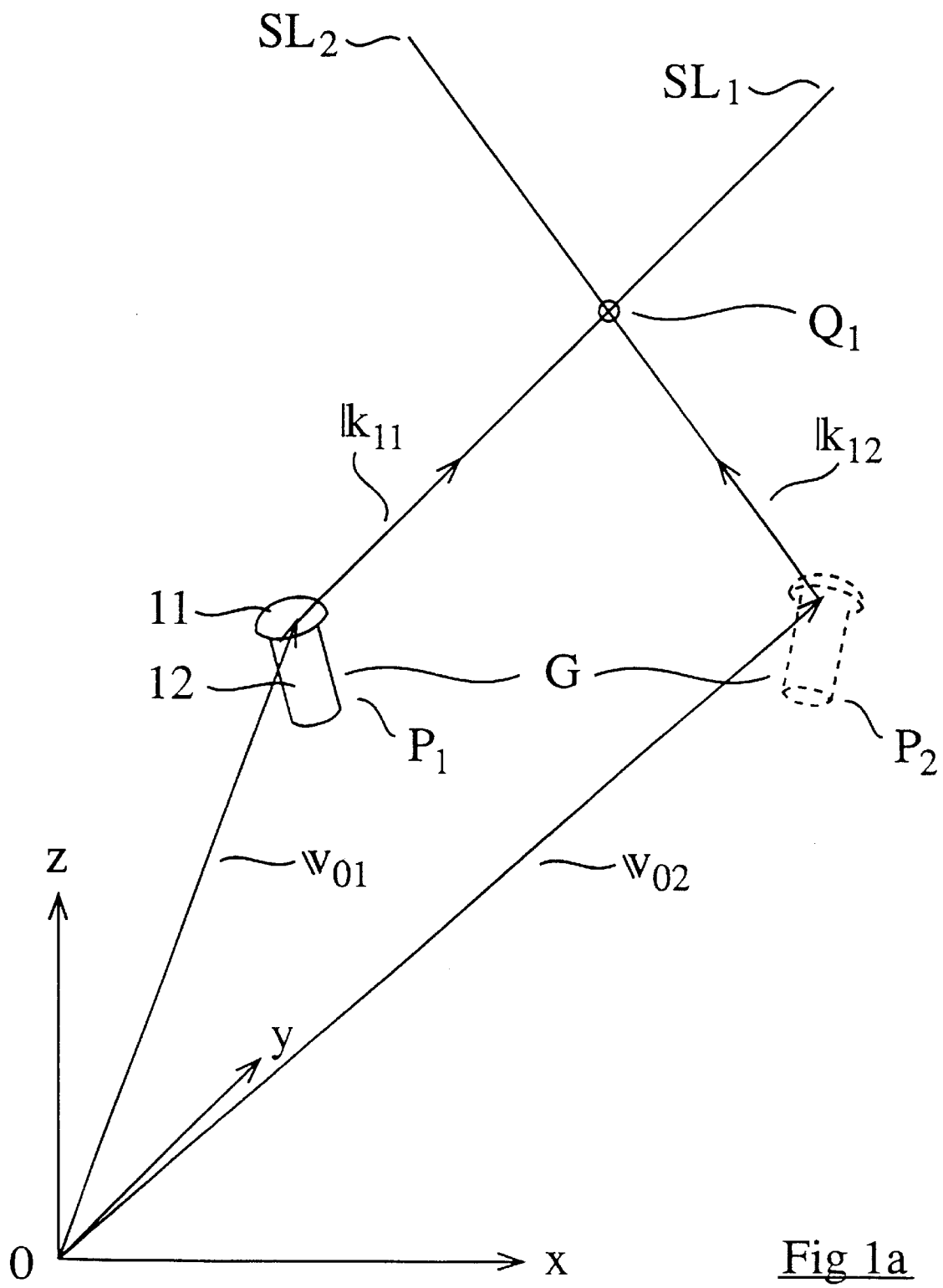
FIG. 1a shows coordinate systems and designations for a simplified case with one object and two transducer locations.

FIG. 1a shows some of the magnitudes used in the method according to the invention in an assumed simplified case with two separate transducer locations. A transducer G is shown in two locations $P_1$ and $P_2$, known in relation to each other. The transducer may be of the type described in the publications mentioned above. In its upper part as shown in the Figure it has a wide-angle lens 11, whose field of vision is thus directed substantially upwards in the Figure. In the example shown in FIG. 1 the transducer is designed to be hand-held and its lower part is therefore in the form of a handle 12. The positions of the two transducer locations are described in an orthogonal coordinate system with origo O and the axes x, y, z by the vectors $v_{01} = (x_{01}, y_{01}, z_{01})$ $v_{02} = (x_{02}, y_{02}, z_{02})$ The orientations of the two transducer locations are also assumed to be known in the coordinate system x-y-z. Each transducer location can thus be described by a six-dimensional vector.

The two transducer locations—including both position and orientation—can be determined by measurement against objects with known positions in the manner described in the above publications. The two transducer locations thus become known in the coordinate system of the known objects and thus also in relation to each other. Alternatively, as will be described in more detail in the following, the two transducer locations may be defined by arranging two transducer locations connected together mechanically in such a way that the two transducer locations become mechanically fixed and known in relation to each other. The two transducer locations will then be defined in a coordinate system that is fixed in relation to the mechanical system. This coordinate system is then assumed to be the one shown in FIG. 1.

In the manner described in the above-mentioned publications the transducer in transducer location $P_1$ determines the direction of the sight line $SL_1$ from the transducer to an object with the as yet unknown position $Q_1$. The position of the object based on this determination can for the moment be described by a vector $v_{11} = v_{01} + t_{11} k_{11}$ where $t_{11}$ is an unknown parameter $k_{11} = (\alpha_{11}, \beta_{11}, \gamma_{11})$ is a unit vector in the direction of the sight line calculated partly from the orientation of the transducer and partly from the direction of the sight line in the coordinate system of the transducer.

The vector $v_{11}$ has the components $x_{11} = x_{01} + t_{11} \alpha_{11}$ $y_{11} = y_{01} + t_{11} \beta_{11}$ $z_{11} = z_{01} + t_{11} \gamma_{11}$ Correspondingly, the direction of the sight line $SL_2$ from the transducer to the same object is determined in transducer location $P_2$. The position of the object based on this measurement is described in the same way by a vector $v_{12} = v_{02} + t_{12} k_{12}$ where $t_{12}$ is an unknown parameter $k_{12} = (\alpha_{12}, \beta_{12}, \gamma_{12},)$ is a unit vector in the direction of the sight line calculated partly from the orientation of the transducer and partly from the direction of the sight line in the coordinate system of the transducer.

The vector $v_{12}$ has the components $x_{12} = x_{02} + t_{12} \alpha_{12}$ $y_{12} = y_{02} + t_{12} \beta_{12}$ $z_{12} = z_{02} + t_{12} \gamma_{12}$ Ideally the object is at the intersection point of the two sight lines. This point can be obtained by solution of the equation system $v_{11} = v_{12}$ i.e.

$v_{01} + t_{11} k_{11} = v_{02} + t_{12} k_{11}$

In the Figure it is assumed that the measurements are exact and that the two sight lines intersect each other in the object $Q_1$. Due to unavoidable measuring errors, however, the two sight lines will generally not intersect each other exactly. The most likely position of the object can IL-hen be determined in accordance with a suitable criterion and the position may, for instance, be assumed to lie midway on the shortest line that can be drawn between any point on one of the sight lines and any point on the other sight line. This position of an object with the serial number "i", in a group of n objects with positions to be determined ($1 \leq i \leq n$) is designated $v_i$ in the following.

The various transducer locations are chosen so that they give different sight lines from the transducer to the objects in question. The accuracy increases the greater the changes in angle of the sight lines when a transducer is moved from one location to another.

Figure 1B:
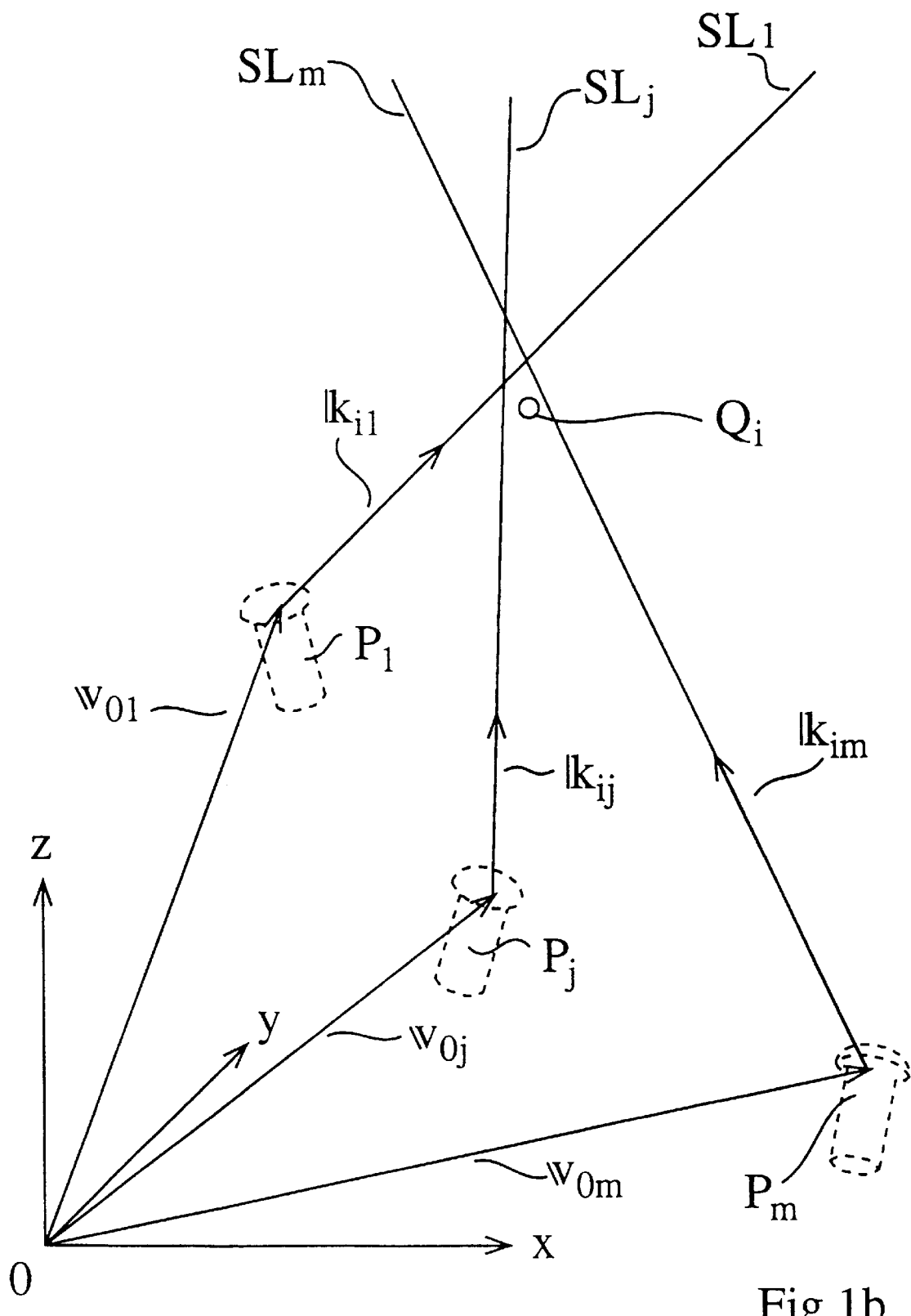
FIG. 1b shows the same magnitudes for the more general case with an arbitrary number of transducer locations.

FIG. 1b shows the more general case with an arbitrary number of separate transducer locations $P_1 \ldots P_j \ldots P_m$ where $m \geq 2$ and where $1 \leq j \leq m$. The transducer locations $P_1$, $P_j$ and $P_m$ are shown in the Figure. For the sake of simplicity only the measurement to a single object in position $Q_i$ is shown in the Figure. However, the object is one of n objects in an arbitrarily large group of objects ($1 \leq i \leq n$). The measurement is performed in the same manner to the other objects in the group, i.e. the sight lines to each of the objects in the group are determined at each transducer location.

The positions of the transducer locations are described by the vectors $v_{01} = (x_{01}, y_{01}, z_{01})$ $v_{0j}=(x_{0j}, y_{0j}, z_{0j})$ $v_{0m}=(x_{0m}, y_{0m}, z_{0m})$ In each transducer location $P_j$ the transducer determines the directions of the sight lines to the object in the manner described in the above publications. The position of the object based on this measurement can be described in the same way by a vector $v_{ij}=v_{0j}+t_{ij}k_{ij}$ with the components $x_{ij}=x_{0j}+t_{ij}\alpha_{ij}$ $y_{ij}=y_{0j}+t_{ij}\beta_{ij}$ $z_{ij}=z_{0j}+t_{ij}\gamma_{ij}$ As described above, the position $Q_i$ of the object is described by a vector $v_i$ with the components $x_i$, $y_i$, $z_i$. An example is described with reference to FIG. 2b, of how the position of the object can be determined on the basis of the sight-line directions $k_{ij}$.

Figure 1C:
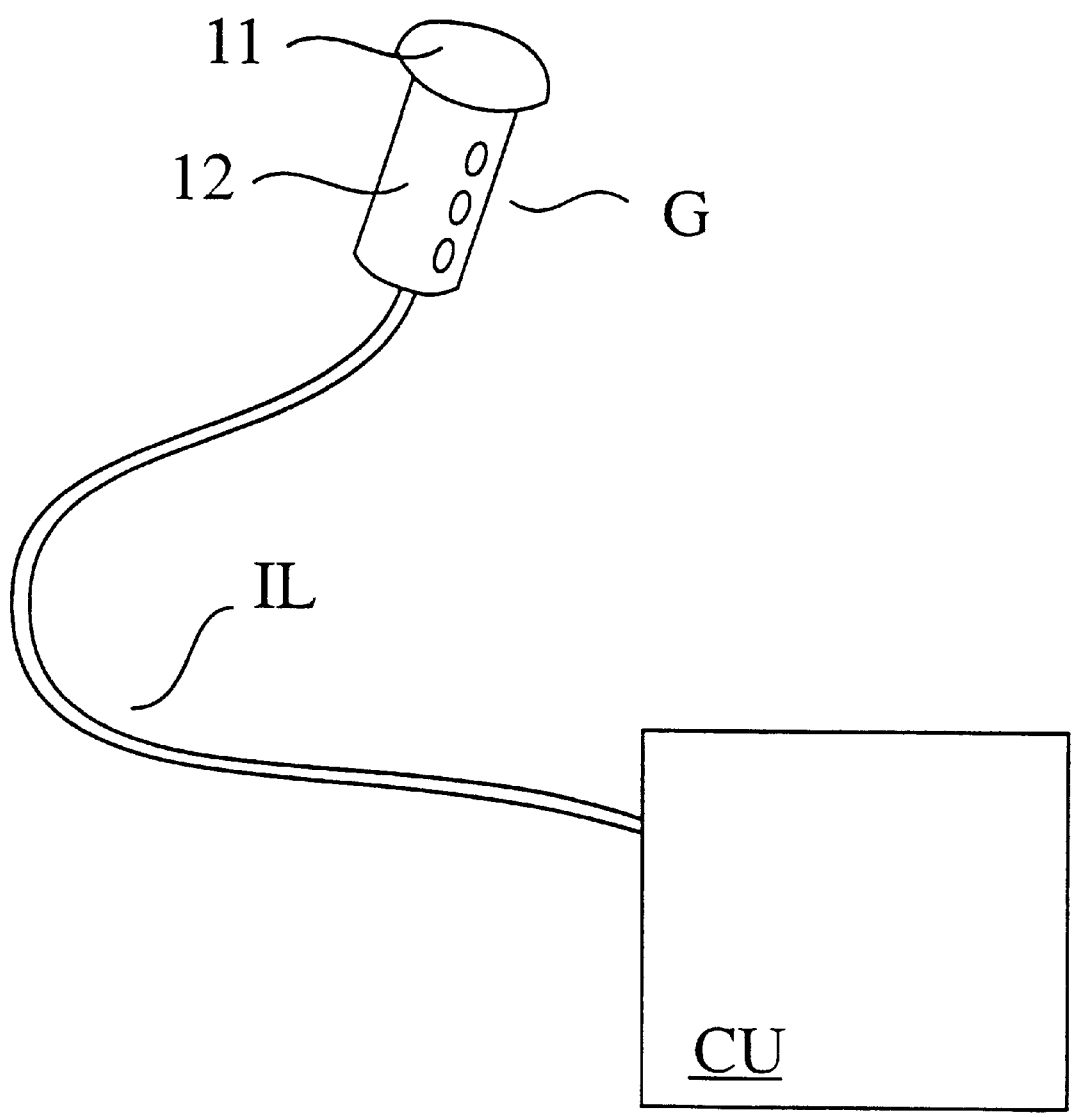
FIG. 1c shows schematically an arrangement for performing the method according to the invention.

FIG. 1c shows schematically an arrangement for performing the method according to the invention. It consists of a transducer G with lens 11 and handle 12. The transducer is connected to a calculation unit CU by means of a signal channel IL in the form of a cable, for instance, a light conductor or an IR link. The transducer, signal channel and calculation unit may be designed in any of the ways described in the publications discussed in the preamble, and the calculation unit may thus consist of a computer programmed to control the measurements, store the results of the measurements and perform the necessary calculations. Besides the means shown in FIG. 1c, there are additional means for determining the transducer locations, e.g. in the form of objects with known positions in the manner described below. The arrangement may also include signal sources. These may either constitute objects themselves or may be arranged to emit optical signals, for instance, towards objects in the form of reflectors.

Figure 2A:
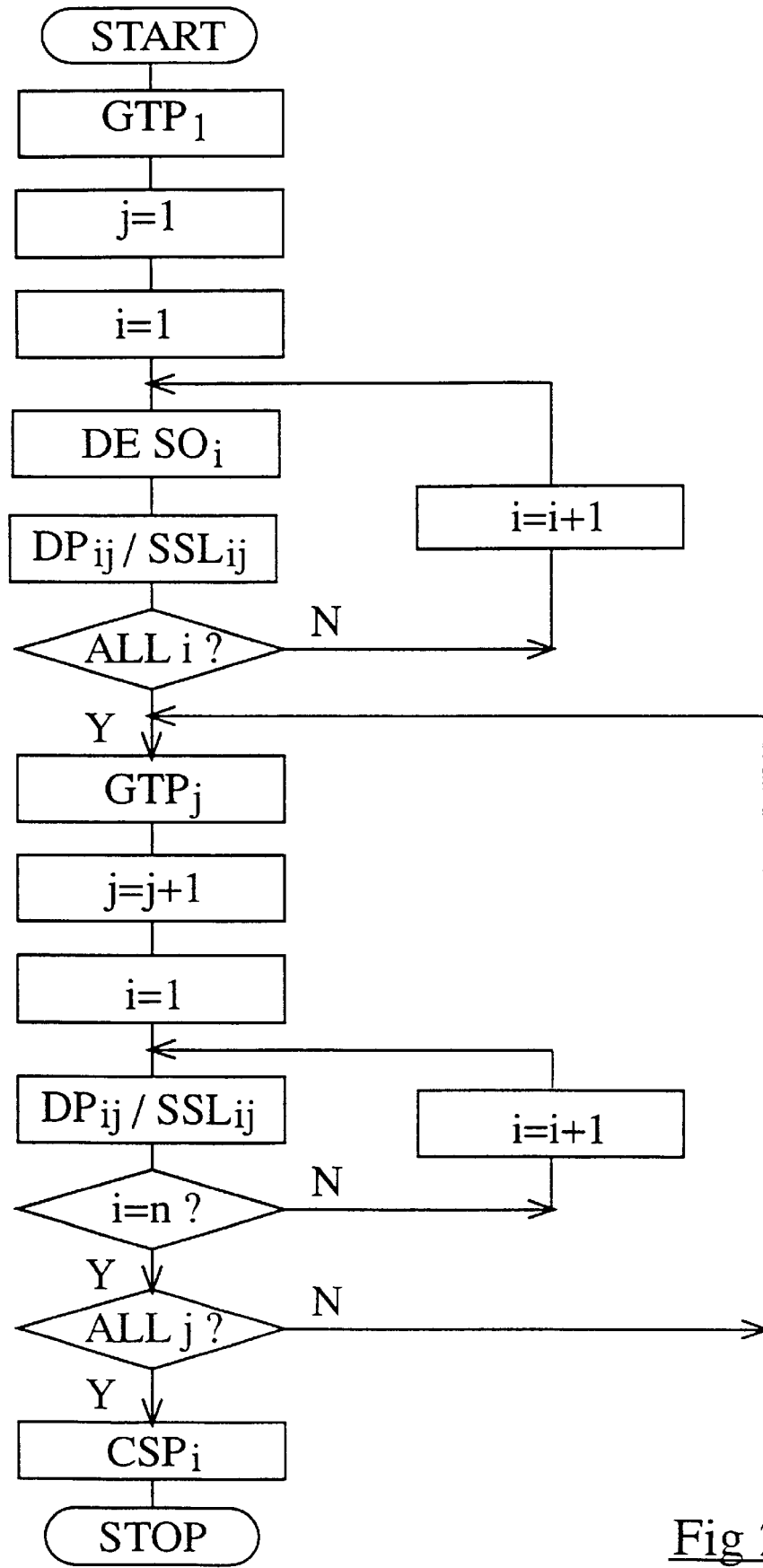
FIG. 2a reveals an example of the measuring procedure according to the invention, in the form of a flow chart.

FIG. 2a shows schematically a measuring procedure according to the invention. The transducer is brought to the first transducer location $P_1$ (block $GTP_1$), and serial number j is set to j=1. The serial number "i" is set to 1 (block i=1). Thereafter the first object to be measured (block $DESO_i$) is designated (selected). In the next block ($DP_{ij}/SSL_{ij}$) the transducer equipment then determines the present location of the transducer, e.g. by means of measurements of known objects in the manner described in the publications described in the preamble, and also the direction $k_{ij}$ to the relevant object. The position $v_{0j}$ of the transducer and the sight-line direction $k_{ij}$ are stored for use in the subsequent calculation of the position of the object. In the next block (ALL i?) an investigation is performed to see if the directions have been determined to all the objects to be measured. If not, the serial number "i" is increased by 1 (the block i=i+1) and the next object is designated. The procedure just described is then repeated for this object. When all objects have been run through, i.e. when i=n, the transducer is moved to the next transducer location $P_j$ ($GTP_j$), the serial number j is set to j+1, and the serial number "i" is again set at 1 (the block i=1). The objects to be measured have now been designated and allocated individual serial numbers "i". The transducer equipment now measures the objects one by one as described above for location Pand stores the transducer position $v_{0j}$ and sight-line direction $k_{ij}$ for each measurement (block $DP_{ij}/SSL_{ij}$). When all objects have been measured (verified in block i=n?) a decision is made as to whether all desired transducer locations have been included (block ALL j?). If not, the measuring procedure is repeated for the next transducer location. When all desired transducer locations have been used the transducer equipment calculates the positions of the objects to be determined on the basis of the stored measured values, and stores these positions. Calculation and storing is performed in block $CSP_i$.

Figure 2B:
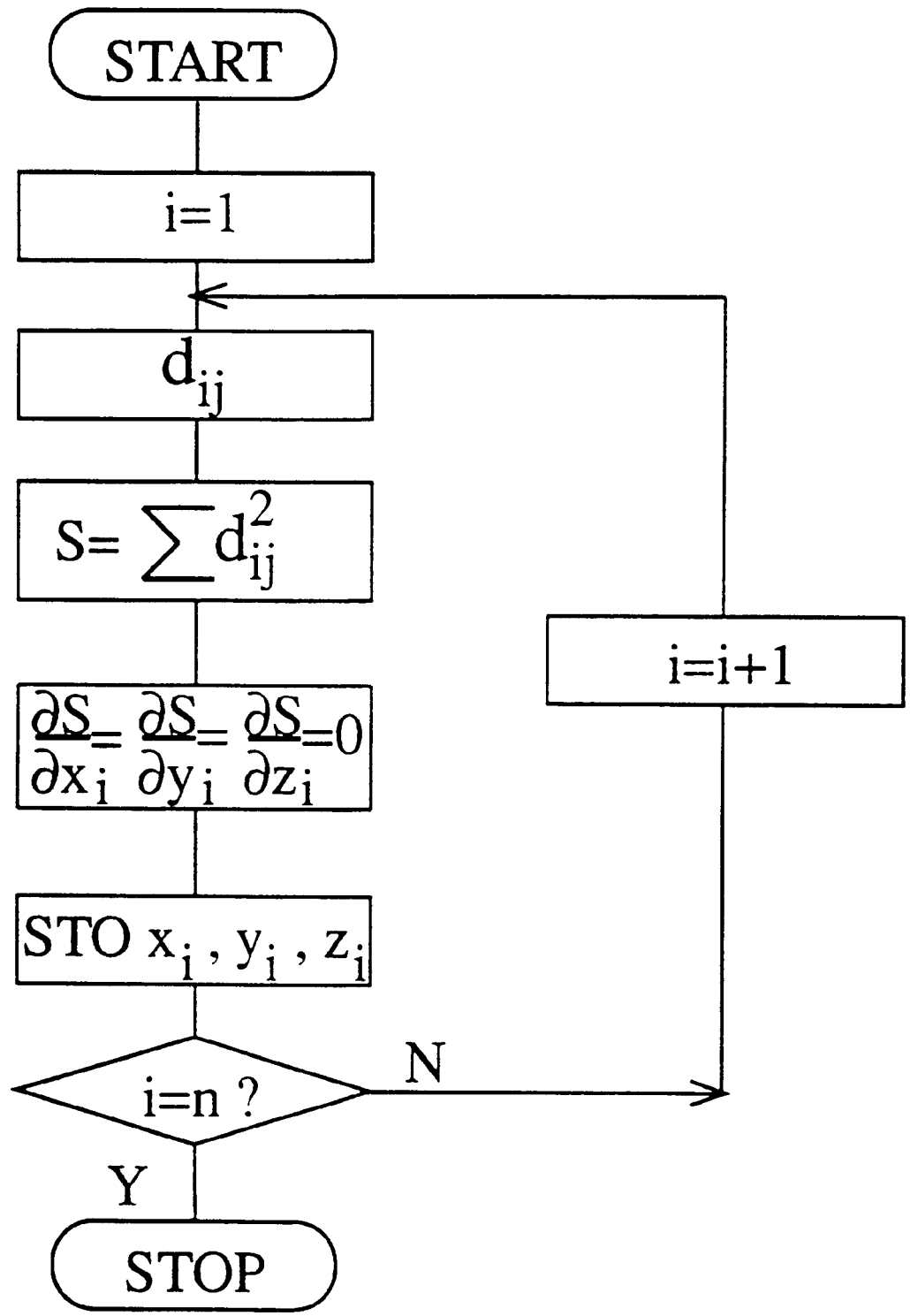
FIG. 2b shows a flow chart of the calculations made during the determination process.

FIG. 2b illustrates the calculation process in the form of a flow chart. The method of least square is used as criterion for determining an objects'position on the basis of the sight lines measured from the various transducer locations to the object, i.e. the object is deemed to have the position resulting in a minimum of the sum of the squares of the distances from the position to the sight lines. When the calculation has commenced i is set =1, i.e. the calculation is first performed for the object with serial number 1 and the calculation on the basis of the sight lines determined from the m different transducer locations (m>2). First (block $d_{ij}$) the distance $d_{ij}$ from an arbitrary point $v_i=(x_i,y_i,z_i)$ is expressed to each of the m sight lines to the object with serial number i from the m transducer locations with serial number j ($1 \leq j \leq m$). The distances are obtained from $$d_{ij} = \frac{k_{ij} \times (v_i - v_{0j})}{|k_{ij}|}$$

where $k_{ij}=(\alpha_{ij}+\beta_{ij}\gamma_{ij})$ $v_{0j}=(x_{0j}, y_{0j}, z_{0j})$ Thereafter the sum S of the squares of the distances $d_{ij}$ is formed in the block $S=\Sigma d_{ij}^2$ i.e.

$$S = \sum_{j=1}^{m} d_{ij}^2$$

The minimum of this sum with regard to $x_i$, $y_i$, $z_i$ is sought in the block $$\frac{\delta S}{\delta x_i} = \frac{\delta S}{\delta y_i} = \frac{\delta S}{\delta z_i} = 0$$

i.e. the sum S is differentiated with regard to $x_i$, $y_i$, $z_i$, after which the three differentiated equations are set equal to zero. The equation system thus obtained will be $$\begin{pmatrix} \sum_{j=1}^{m}(1-\alpha_{ij}^2) & -\sum_{j=1}^{m}\alpha_{ij}\beta_{ij} & -\sum_{j=1}^{m}\alpha_{ij}\gamma_{ij} \\ -\sum_{j=1}^{m}\alpha_{ij}\beta_{ij} & \sum_{j=1}^{m}(1-\beta_{ij}^2) & -\sum_{j=1}^{m}\beta_{ij}\gamma_{ij} \\ -\sum_{j=1}^{m}\alpha_{ij}\gamma_{ij} & -\sum_{j=1}^{m}\beta_{ij}\gamma_{ij} & \sum_{j=1}^{m}(1-\gamma_{ij}^2) \end{pmatrix} \begin{pmatrix} x_i \\ y_i \\ z_i \end{pmatrix} =$$

$$\begin{pmatrix} \sum_{j=1}^{m}(x_{0j} - \alpha_{ij}^2 x_{0j} - \alpha_{ij}\beta_{ij}y_{0j} - \alpha_{ij}\gamma_{ij}z_{0j}) \\ \sum_{j=1}^{m}(y_{0j} - \beta_{ij}^2 y_{0j} - \beta_{ij}\alpha_{ij}x_{0j} - \beta_{ij}\gamma_{ij}z_{0j}) \\ \sum_{j=1}^{m}(z_{0j} - \gamma_{ij}^2 z_{0j} - \gamma_{ij}\alpha_{ij}x_{0j} - \gamma_{ij}\beta_{ij}y_{0j}) \end{pmatrix}$$

where $\alpha_{ij}$, $\beta_{ij}$, $\gamma_{ij}$, $x_{0j}$, $y_{0j}$ and $z_{0j}$ are known. The equation system is solved in known manner. The values $x_i$, $y_i$, $z_i$ obtained from the equation system constitute the sought location of the object since there is obviously a physical minimum for the sum S (and not a maximum).

The position of the object with serial number i obtained in this way is stored in the block STO $x_i$, $y_i$, $z_i$. A check is made in block i=n? to ensure that the position has been calculated for all n objects. If not, i is set to =i+1 and the calculation is repeated for the next object.

The above is a description of how the determination procedure can be performed by determining the sight-line directions in at least two separate transducer locations. In principle it is sufficient with two transducer locations as long as both positions do not lie along the same sight line to one of the objects for which the position is to be determined. However, a larger number of measurements is preferable. This can be achieved, for instance, by varying the position and orientation of the transducer substantially arbitrarily during which the system, preferably automatically and at frequent intervals, (when necessary) determines the location of the transducer and also in each location determines the directions of the sight lines to the objects whose positions are to be determined. When a sufficient number of measurements (e.g. 100–10,000 measurements) have been performed, the positions of the objects are calculated using all the measurements taken. The accuracy of determining the positions can thus be substantially improved.

Figure 2C:
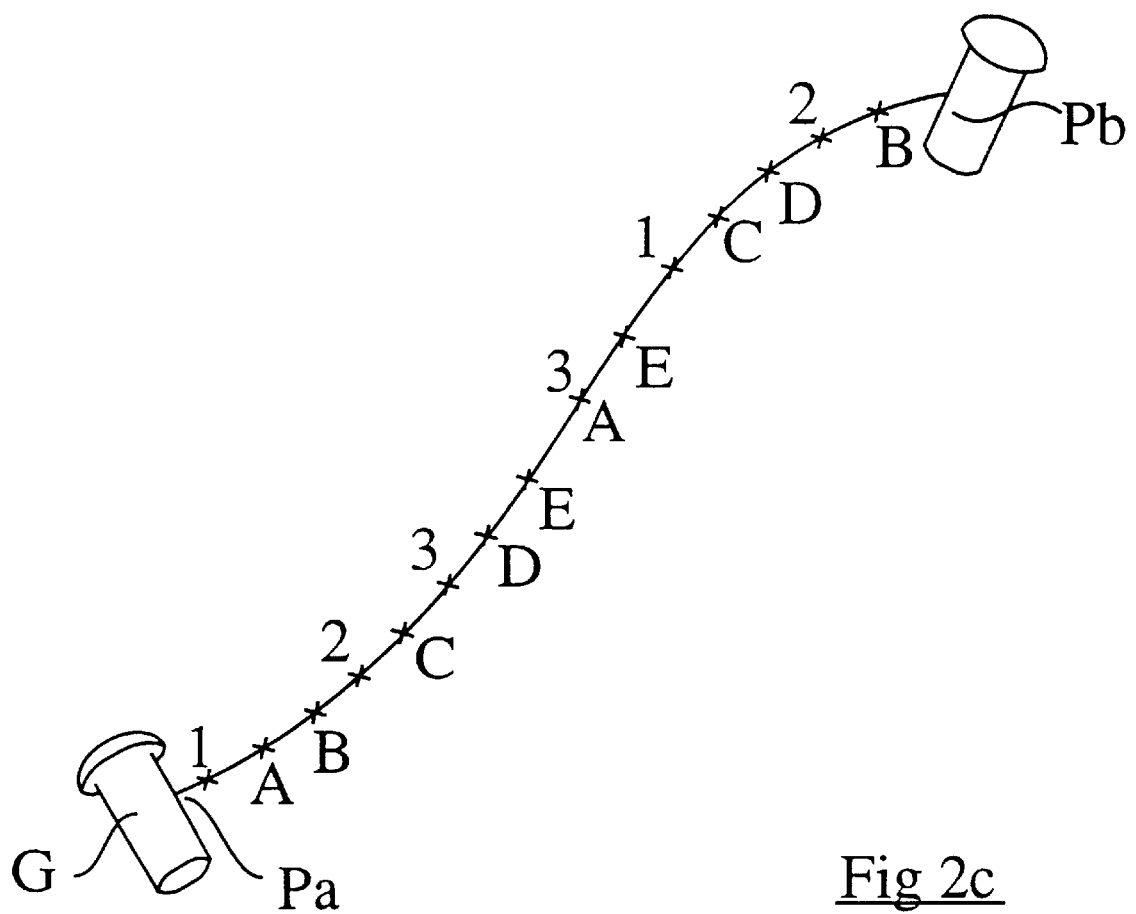
FIG. 2c illustrates an alternative procedure of determination.

According to an alternative measuring method the transducer can be moved substantially continuously (i.e. without stopping in specific locations). The sight lines to the various objects are then measured continuously. Measuring the sight lines to the reference objects is performed at suitable intervals and the actual location of the transducer each time a sight line is measured to a new object is obtained, e.g. by interpolation between the measurements of the sight lines to the reference objects. Such a method is illustrated in FIG. 2c. A transducer G is passed continuously along a path between a first transducer location $P_a$ and a second transducer location $P_b$. Sight lines to a first, a second, a third reference object, and so on, are measured at a number of points 1, 2, 3, and so on, along the path. Sight lines to a first, a second, a third, and so on, object in a group of new objects, with unknown positions are measured at a number of points A, B, C, and so on, along the path. The measurements are preferably performed automatically and the sight lines to the reference objects are measured at such frequent intervals that the transducer location at each measurement of the sight line to a new object can be obtained with sufficient accuracy through interpolation.

When a plurality of objects and a plurality of transducer locations are used, it is not certain that all the objects will be visible for all transducer locations. In this case only information from the transducer locations from which the object is visible is used to determine the position of each object. (However, an object must of course be visible from at least two different transducer locations.)

As is clear from the above, a transducer equipment of the type described in the introduction is used in the method described. Since such equipment contains calculation means it is suitable also to use these calculation means for the calculations required in the procedure to determined the objects'positions described above. The calculation means of the transducer equipment preferably consists of a digital processor equipment, suitably programmed. It can then also be programmed to perform the above calculations.

The method described above thus allows a number of objects with previously unknown positions to be given determined positions, and their positions stored. They can thereafter be used for position-determining with the aid of transducer equipment of the type described in the introduction.

Figure 3A:
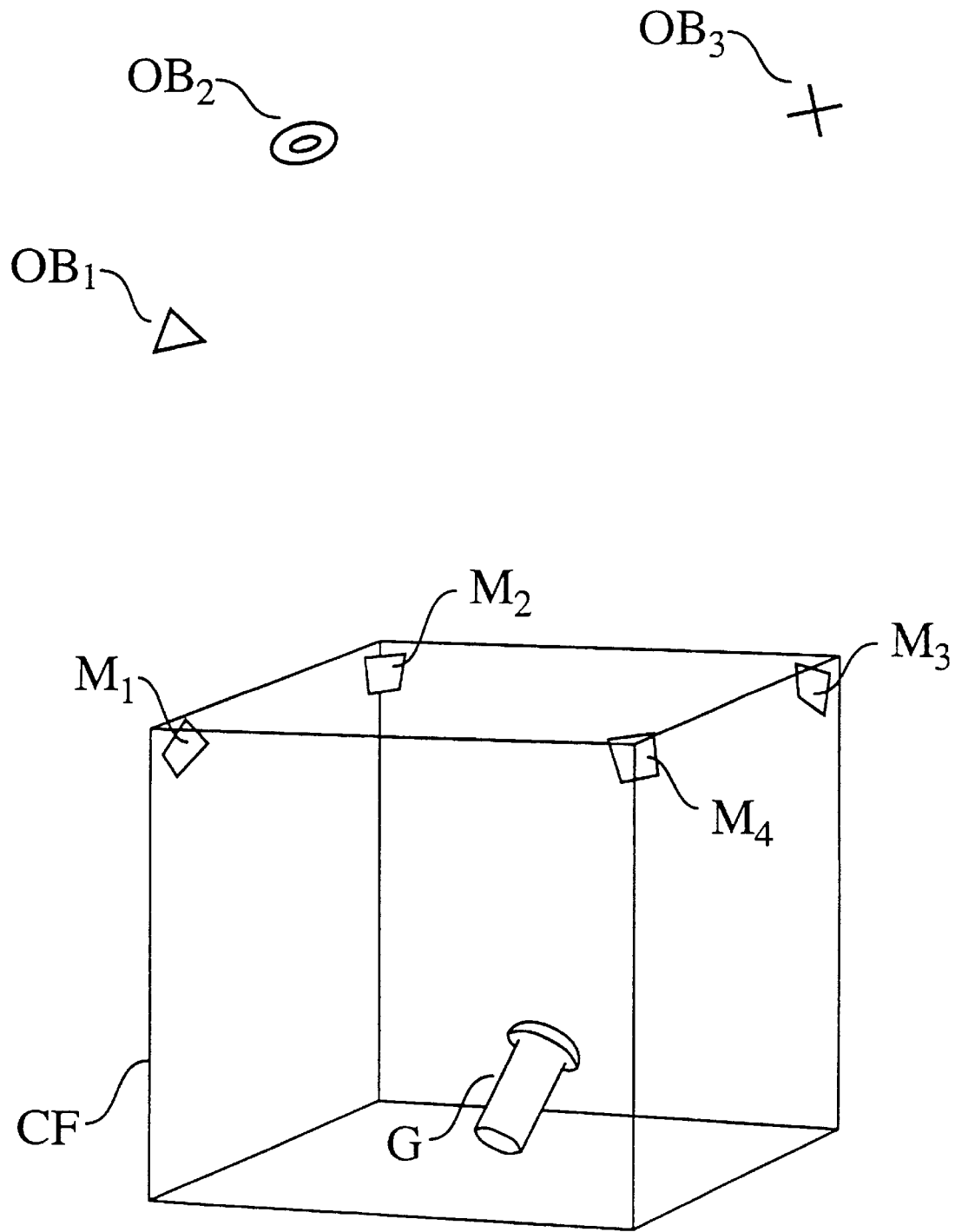
FIG. 3a shows a portable frame according to the invention, with reference markers.

FIG. 3a shows how, according to one embodiment of the invention, a stand CF can be used for the location-determining of the transducer when measuring objects with unknown positions in the figure. The stand may have a side length of a meter or so, for instance, but its dimensions must of course be suitable for the application. It is provided with objects facing the interior of the stand, in the form of markers $M_1$–$M_4$. The objects whose positions are to be determined are designated $OB_1$–$OB_3$. The stand is perforated and as open as possible so as to impede the view between transducer and objects $OB_1$–$OB_3$ as little as possible. During measurement the transducer G is held inside the stand and moved between different locations, the latter being so chosen that at each location the transducer has at least three markers $M_1$–$M_4$ and at least one of the objects $OB_1$–$OB_3$ within its field of vision simultaneously. The positions of the markers $M_1$–M4 in relation to each other are known, thus enabling the transducer equipment in each transducer location, on the basis of these known positions and the sensed directions to the markers, to determine the location of the transducer. The positions of the objects are determined as described above on the basis of the transducer locations thus determined and of the sensed directions to the objects $OB_1OB_3$.

For the sake of simplicity only four markers are shown in FIG. 3a. However, the stand is preferably provided with more markers than shown to enable the location of the transducer to be reliably determined, preferably independently of its orientation and of its location in the stand. Markers may be applied in each corner and midway on each side of the stand, for instance (see FIG. 3b). The markers may also be of different types in order to supply more information.

The stand CF may be in the form of a frame of metal sections or rods with suitable reinforcement, e.g. in the form of diagonals or corner plates, so that the positions of the markers in relation to each other are maintained with sufficient accuracy. The stand is preferably parallel-epipedic in shape and, according to a preferred embodiment, is collapsible and portable. When the required markers have been placed out, or other suitable objects have been defined, the stand is placed in a suitable place in relation to the objects/markers and the measurement is performed. The stand can then be removed and the transducer equipment thereafter makes use of the determined objects.

A stand of the type described can be used not only for measurement in the manner described but also during operation of a transducer equipment. The work space of the transducer then consists substantially of the interior of the stand and, during operation, the transducer uses the stand's own markers. The shape and dimensions of the stand are adjusted to the application so that the transducer equipment and any arrangements supporting it (e.g. an industrial robot) can operate freely within a sufficiently large work space. A transducer equipment can thus being taken into operation very quickly and imply by unfolding the stand and placing it in the desired place. The same is applicable to moving its work space, in which case the stand is simply moved to the new site. In this application, the stand does not necessarily have to have a clear view of external objects.

Figure 3B:
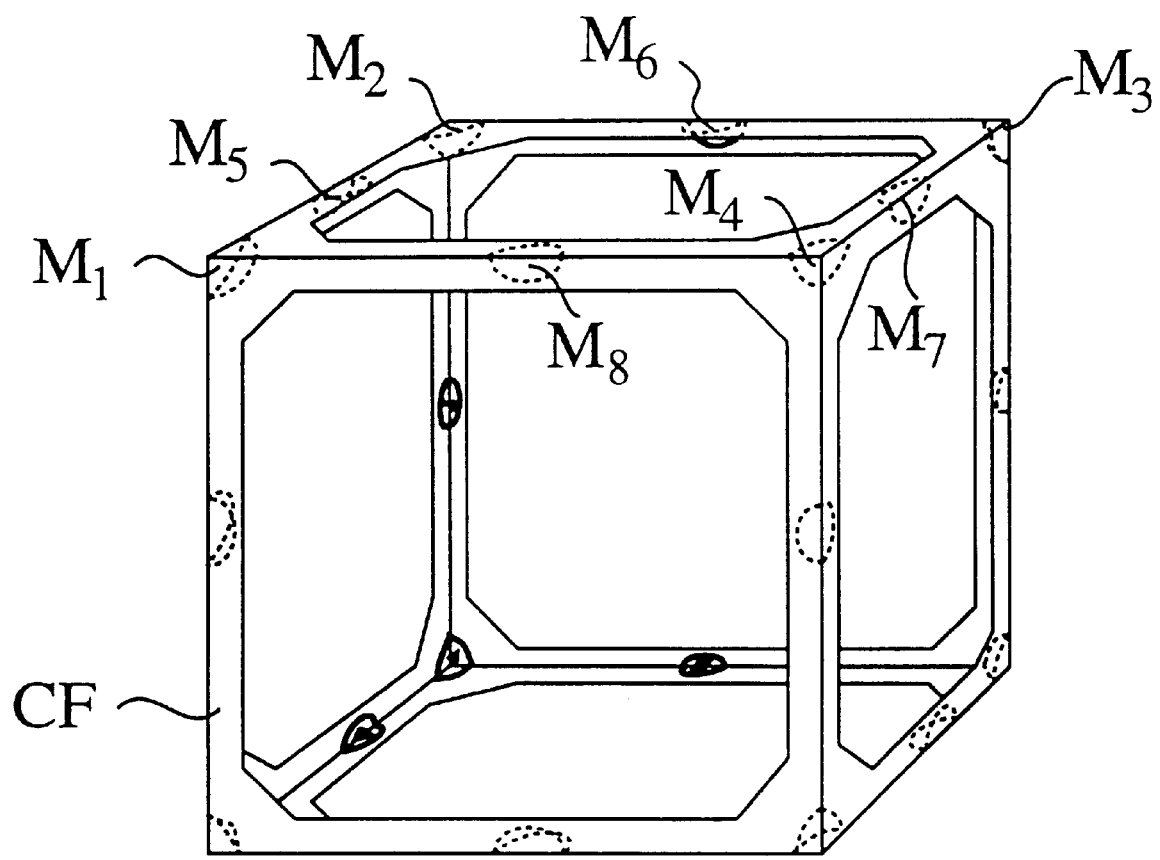
FIG. 3b shows in more detail an example of such a frame.

FIG. 3b shows an embodiment of the stand CF described above. It consists of a parallel-epipedic box with open sides. The box may be made of metal or plastic, for instance. According to one embodiment it consists of the box in which the transducer equipment was packed upon delivery. The box may be made of cardboard with markers already printed on the inside and with tear indications enabling removal of those parts of the side surfaces that shall be open. The positions of the markers in relation to each other may be pre-programmed in the transducer equipment. This embodiment enables a transducer equipment to be taken into operation, or its work space to be moved, extremely simply and quickly.

Figure 3C:
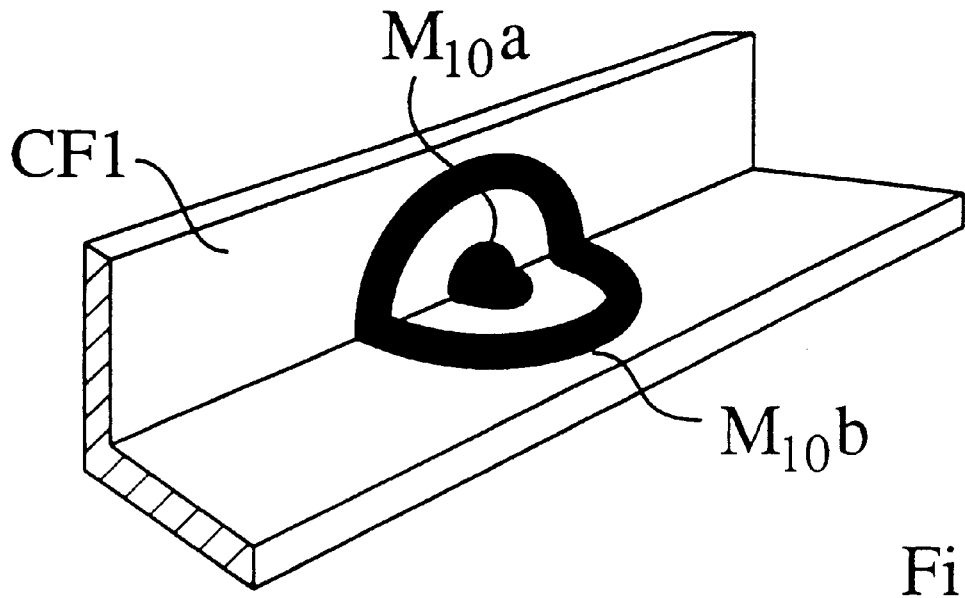
FIGS. 3c and 3d show examples of the markers' shape in the frame according to FIG. 3b.

FIG. 3c shows an example of how a marker may be arranged inside the stand, midway on one of its sides CF1. The marker is in the shape of a small filled circle $M_{10}a$ with a surrounding circle $M_{10}b$. It may consist of reflecting paint or tape for illumination by a light source applied on the transducer. It may possibly consist of fluorescent paint for illumination by an ultraviolet light source. If the stand is in the form of a cardboard box, the marker may be printed or applied on the box at the time of manufacture. This also applies to markers arranged in the corners.

Figure 3D:
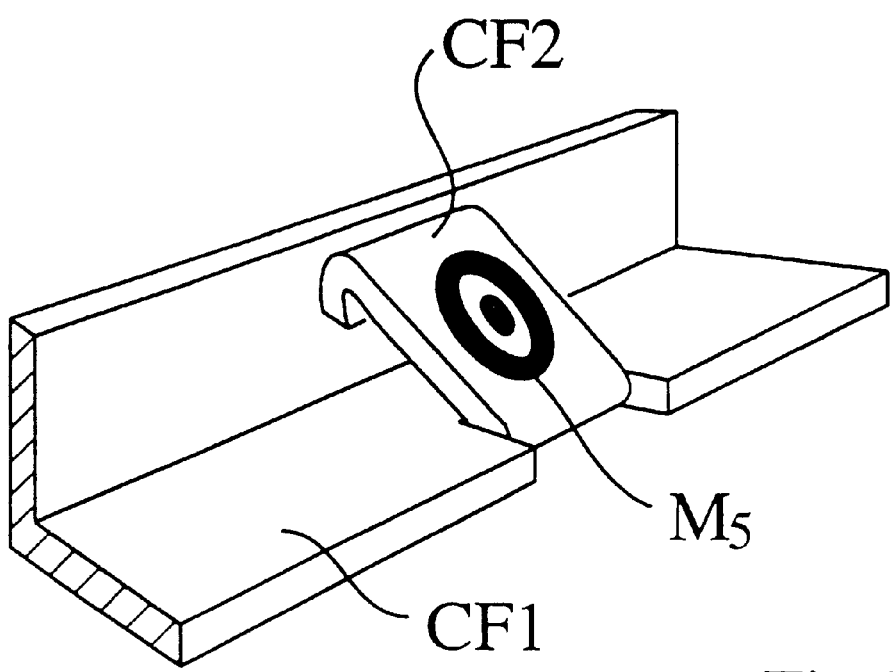

FIG. 3d shows how a marker $M_5$ may alternatively be arranged on a tab CF2 of the box material. The tab forms part of the bottom of the box during manufacture and is provided with tear indications along three sides. The tab is folded up along its fourth side against the vertical part of the side CF1 and attached to this, e.g. by tape or by being inserted into a pre-punched slit in the side CF1.

The structures described above with reference to FIGS. 3a–3d, carrying the reference markers $M_1$, $M_2$ etc. are only a few of many feasible embodiments of such a structure. The structure letting through the relevant signals may alternatively consist of a globe or other container having walls of material pervious to the relevant wavelength band (such as glass or plastic in the case of optical signals) and where the reference markers may consist of markers or reflecting tape applied on the inside of the walls.

The structures described above with reference to FIGS. 3a–3d consist of frames with parallel-epipedic shape. Of course, the structures need not be parallel-epipedic in shape but may be in the shape of any regular or irregular polyhedron.

Figure 4A:
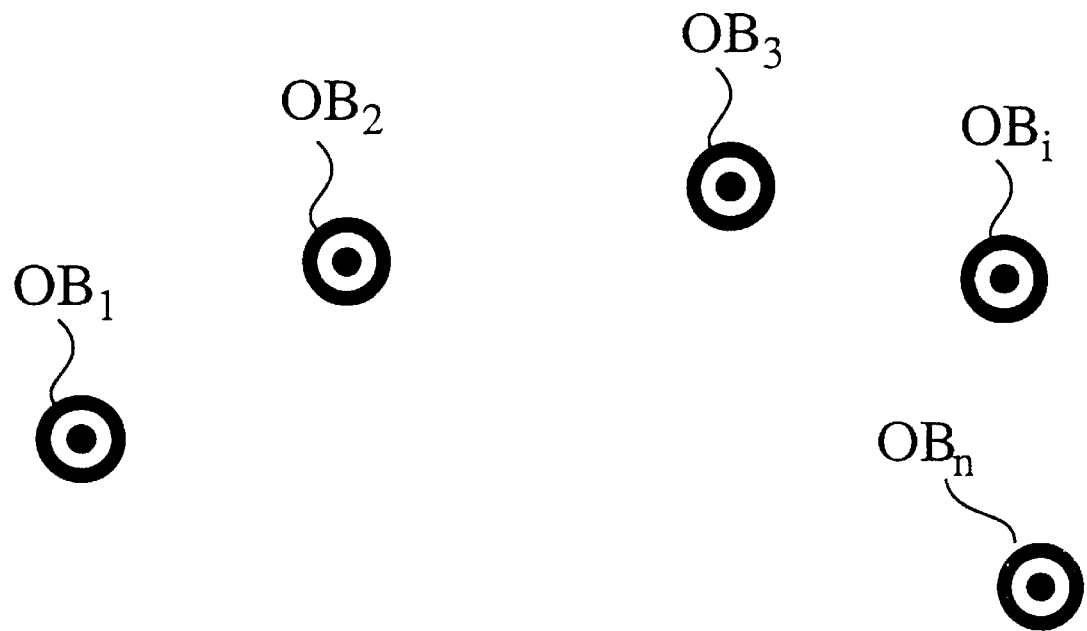
FIG. 4a shows how a beam with two transducer locations can be used in the method according to the invention.
Figure 4A:
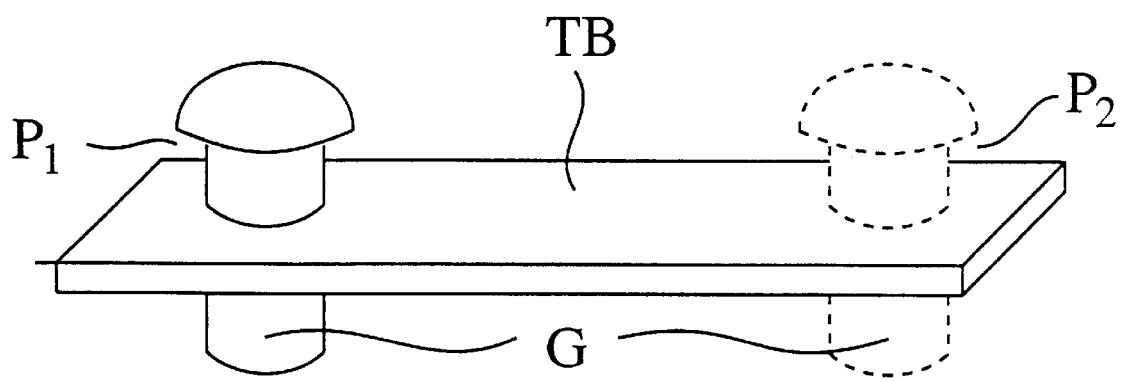

FIG. 4a shows a rectangular beam TB with two transducer locations. A transducer G may be placed in either of the transducer locations. These are so shaped that the location of the transducer in each transducer locations is carefully defined in relation to the beam. The transducer may thus assume the locations $P_1$ and $P_2$, which are accurately known in relation to each other. When performing a-measurement with the transducer in one of the transducer locations, e.g. $P_1$, the directions to the objects $OB_1$–$OB_n$ are determined first. Then, without altering the position or orientation of the beam, the same thing is performed with the transducer in location $P_2$. Thus the directions of the sight lines for each object are known from two separate locations, which are in turn known in relation to each other since they are defined by the transducer locations in the beam. As is clear from the description above with reference to FIGS. 1 and 2, this enables determination of the positions of the objects. These positions will admittedly be determined in the coordinate system of the beam, which is of no interest. However, since the positions of the objects are known in a coordinate system, the positions of the objects in relation to each other are also known. The use of a transducer system requires knowledge of these relative positions, and the relative positions are independent of in which coordinate system the absolute positions are determined.

The beam TB in FIG. 4a is shown only schematically. It may be designed in many ways, such as in the form of a rod or a metal section with a holder for a transducer at each end. Alternatively, the beam TB may be provided with two transducers, one in each transducer location. Coordinating the measurements between the two transducers allows elimination of the requirement of not moving the beam.

The arrangement described here can be provided with more than two transducers or transducer locations. It may, for instance, be in the form of a triangular frame with three transducer locations. Similarly, the beam or frame may be provided with two or more transducers or transducer locations directed in different directions in order to give greater freedom in orienting the beam/frame.

Figure 4B:
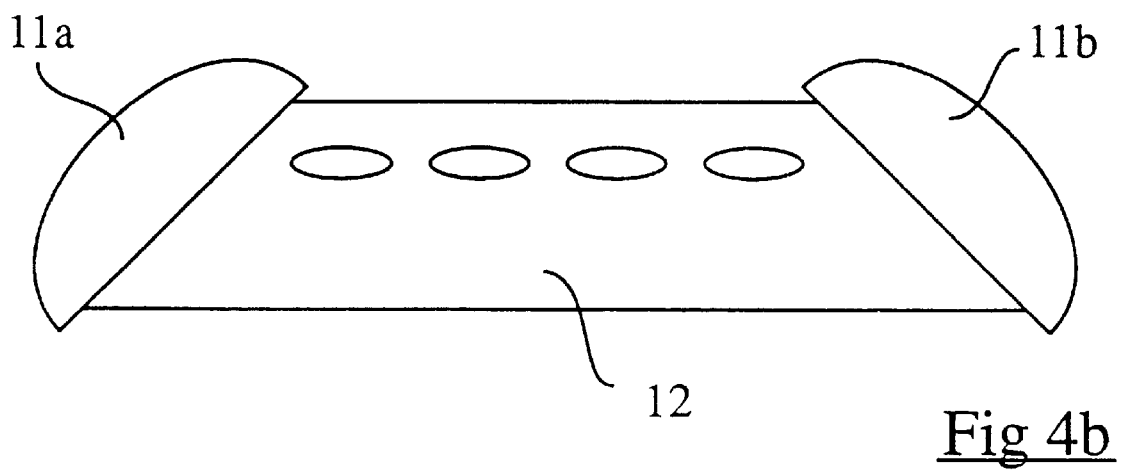
FIG. 4b shows a hand-held transducer unit with two sensors.

The arrangement may be in the form of an integrated and e.g. hand-held transducer unit with two or more transducers. Such a transducer unit can be made auto-determining new objects'positions. A transducer unit of this type is shown in FIG. 4b. It has a central part 12 shaped so that it can be held comfortably in the hand. Direction-sensing sensors 11a and 11b of previously described type are provided at each end. The sensors are angled in relation to each other, or they may be parallel (as in FIG. 4a) or oppositely directed.

Figure 5:
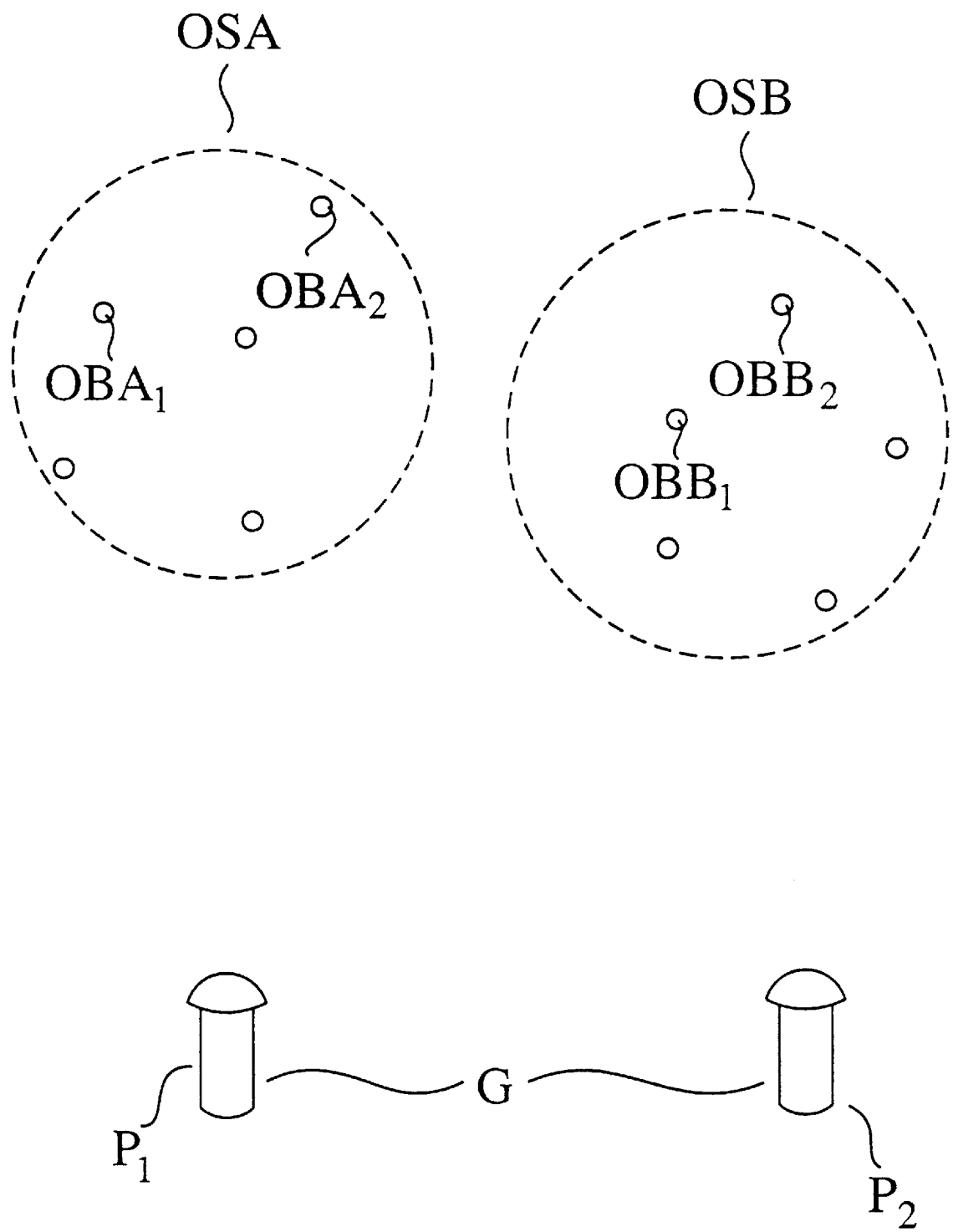
FIG. 5 illustrates how objects with already determined positions in can be used for determining the positions of new objects when extending the working range of the transducer equipment.

In the same way as described with reference to FIG. 3 the measuring accuracy can be greatly increased by performing a plurality of measurements with the beam in different locations. FIG. 5 shows a transducer G which, when in operation, makes use of a set OSA of objects ($OBA_1$, $OBA_2$ ... ), the positions of which are known, e.g. by the objects having previously been determined in one of the ways described above. When extending the working range the objects can be used for determining the positions of a set OSB of new objects ($OBB_1$, $OBB_2$ ... ). In principle, this can be performed in the manner described with reference to FIGS. 1–3, i.e. in each of a plurality of (at least two) separate transducer locations ($P_1$ and $P_2$ in FIG. 5) the transducer's location is determined with the aid of the known objects OSA and also the directions to the objects in the set OSB, after which the positions of the objects in set OSB are calculated in the manner described.

As is clear from the above, the invention offers a method to determine the positions of objects with unknown positions to be performed quickly and simply with great accuracy, without the need for any measuring equipment other than the transducer equipment which is to make use of the determined objects, possibly supplemented by a simple mechanical structure.

What is claimed is:

1. A method of determining positions of objects ($OB_1$–$OB_n$, OSB) in equipment to determine the position or orientation of a transducer with the aid of a set of objects ($OB_1$–$OB_n$, $M_1$–$M_n$, OSA, OSB), which are arranged to emit signals that propagate linearly between the objects and the transducer, said equipment having the transducer (G) designed to receive signals being emitted by objects in said set, means arranged to produce direction-defining signals that define directions in relation to the transducer, of the sight lines from the transducer to the objects, and calculation means arranged, on the basis of the signals that define the direction to a number of objects ($M_1$–$M_n$, OSA) with known positions in relation to each other, to generate information defining the position or orientation of the transducer, the method comprising determining for each of the objects ($OB_1$–$OB_n$, OSB) to be positionally determined, the directions of the sight lines to the object with the aid of the transducer (G) from at least two separate transducer locations ($P_1$, $P_2$) known in relation to each other, determining at least certain transducer locations ($P_1$, $P_2$) with the aid of a plurality of reference objects ($M_1$–$M_n$, OSA) with known positions in relation to each other, wherein the transducer locations are calculated from the positions of the reference objects and from the directions sensed by the transducer of the sight lines from the transducer to the reference objects, calculating, for the objects to be positionally determined, a measurement of the position ($v_i$) or orientation of the object from the said transducer locations ($P_1$, $P_2$) and from the directions ($k_{ij}$) to the object determined with the aid of the transducer.

2. The method as claimed in claim 1, wherein a holding device (CF) carrying the reference objects is used during the determination of objects.

3. The method as claimed in claim 2, wherein the holding device is three-dimensional and is used during the measurement, and that the transducer locations are selected so that at least certain of the transducer location are situated within the holding device.

4. The method as claimed in claim 1, wherein the transducer used in the determination process is carried by hand.

5. An arrangement for creating a set of objects with known positions for equipment to determine the position or orientation of a transducer with the aid of a set of objects ($OB_1$–$OB_n$, $M_1$–$M_n$, OSA, OSB), which are arranged to emit signals that propagate linearly between the objects and the transducer, said equipment having a transducer (G) designed to receive signals being emitted by objects in said set, means arranged to produce direction-defining signals that define the direction in relation to the transducer, of the sight lines from the transducer to the objects, calculation means arranged, on the basis of the signals that define the directions to a number of objects ($M_1$–$M_n$, OSA), with known positions in relation to each other, to generate information defining the position or orientation of the transducer, and, a mechanical structure (CF) with a plurality of reference objects ($M_1$–$M_n$), whose positions in relation to each other are known, is carried by the structure to determine the position or orientation of the transducer.

6. The arrangement as claimed in claim 5, wherein the mechanical structure consists of a frame.

7. The arrangement as claimed in claim 6, wherein the mechanical structure is three-dimensional and has reference objects ($M_1$–$M_n$) facing the interior of the structure, the structure and the reference objects being so arranged that the transducer can be arranged in a plurality of separate transducer locations within the structure.

8. The arrangement as claimed in claim 6, wherein the mechanical structure is designed to be portable.

9. The arrangement as claimed in claim 6, wherein the mechanical structure is in the form of a polyhedron.

10. The arrangement as claimed in claim 5, wherein the mechanical structure is three-dimensional and has reference objects ($M_1$–$M_n$) facing the interior of the structure, the structure and the reference objects being so arranged that the transducer can be arranged in a plurality of separate transducer locations within the structure.

11. The arrangement as claimed in claim 10, wherein the mechanical structure is designed to be portable.

12. The arrangement as claimed in claim 10, wherein the mechanical structure is in the form of a polyhedron.

13. The arrangement as claimed in claim 5, wherein the mechanical structure is designed to be portable.

14. The arrangement as claimed in claim 13, wherein the mechanical structure is in the form of a polyhedron.

15. The arrangement as claimed in claim 5, wherein the mechanical structure is in the form of a polyhedron.

16. A method of determining positions of objects ($OB_1$–$OB_n$, OSB) in equipment to determine the position and orientation of a transducer with the aid of a set of objects ($OB_1$–$OB_n$, $M_1$–$M_n$, OSA, OSB), which are arranged to emit signals that propagate linearly between the objects and the transducer, said equipment having the transducer (G) designed to receive signals being emitted by objects in said set, means arranged to produce direction-defining signals that define directions in relation to the transducer, of the sight lines from the transducer to the objects, and calculation means arranged, on the basis of the signals that define the direction to a number of objects ($M_1$–$M_n$, OSA) with known positions in relation to each other, to generate information defining the position or orientation of the transducer, the method comprising determining for each of the objects ($OB_1$–$OB_n$, OSB) to be positionally determined, the directions of the sight lines to the object with the aid of the transducer (G) from at least two separate transducer locations ($P_1$, $P_2$) known in relation to each other, determining at least certain transducer locations ($P_1$, $P_2$) with the aid of a plurality of reference objects ($M_1$–$M_n$, OSA) with known positions in relation to each other, wherein the transducer locations are calculated from the positions of the reference objects and from the directions sensed by the transducer of the sight lines from the transducer to the reference objects, calculating, for the objects to be positionally determined, a measurement of the position ($v_i$) and orientation of the object from the said transducer locations ($P_1$, $P_2$) and from the directions ($k_{ij}$) to the object determined with the aid of the transducer.

17. The method as claimed in claim 16, wherein a holding device (CF) carrying the reference objects is used during the determination of objects.

18. The method as claimed in claim 17, wherein the holding device is three-dimensional and is used during the measurement, and that the transducer locations are selected so that at least certain of the transducer locations are situated within the holding device.

19. The method as claimed in claim 16, wherein the transducer used in the determination process is carried by hand.

20. An arrangement for creating a set of objects with known positions for equipment to determine the position and orientation of a transducer with the aid of a set of objects ($OB_1$–$OB_n$, $M_1$–$M_n$, OSA, OSB), which are arranged to emit signals that propagate linearly between the objects and the transducer, said equipment having a transducer (G) designed to receive signals being emitted by objects in said set, means arranged to produce direction-defining signals that define the direction in relation to the transducer, of the sight lines from the transducer to the objects, calculation means arranged, on the basis of the signals that define the directions to a number of objects ($M_1$–$M_n$, OSA), with known positions in relation to each other, to generate information defining the position and orientation of the transducer, and, a mechanical structure (CF) with a plurality of reference objects ($M_1$–$M_n$), whose positions in relation to each other are known, is carried by the structure to determine the position or orientation of the transducer.

21. The arrangement as claimed in claim 20, wherein the mechanical structure consists of a frame.

22. The arrangement as claimed in claim 21, wherein the mechanical structure is three-dimensional and has reference objects ($M_1-M_n$) facing the interior of the structure, the structure and the reference objects being so arranged that the transducer can be arranged in a plurality of separate transducer locations within the structure.

23. The arrangement as claimed in claim 21, wherein the mechanical structure is designed to be portable.

24. The arrangement as claimed in claim 21, wherein the mechanical structure is in the form of a polyhedron.

25. The arrangement as claimed in claim 20, wherein the mechanical structure is three-dimensional and has reference objects ($M_1-M_n$) facing the interior of the structure, the structure and the reference objects being so arranged that the transducer can be arranged in a plurality of separate transducer locations within the structure.

26. The arrangement as claimed in claim 25, wherein the mechanical structure is designed to be portable.

27. The arrangement as claimed in claim 25, wherein the mechanical structure is in the form of a polyhedron.

28. The arrangement as claimed in claim 20, wherein the mechanical structure is designed to be portable.

29. The arrangement as claimed in claim 28, wherein the mechanical structure is in the form of a polyhedron.

30. The arrangement as claimed in claim 20, wherein the mechanical structure is in the form of a polyhedron.

* * * * *